United States Patent Office 3,459,758
Patented Aug. 5, 1969

---

3,459,758
9,10 - DIHYDRO - 4H - PYRAZOLO[1′,5′:1,6]PYRIDO [3,4-b]INDOLE - 2,3 - DICARBOXYLIC ACIDS AND ESTERS
Hans A. Wagner, Skokie, Ill., assignor to G. D. Searle & Co., Chicago, Ill., a corporation of Delaware
No Drawing. Filed Nov. 9, 1967, Ser. No. 681,897
Int. Cl. C07d 57/00; A61k 27/00
U.S. Cl. 260—295.5    15 Claims

ABSTRACT OF THE DISCLOSURE

Preparation of the captioned compounds and their valuable pharmacological properties, including pepsin-inhibiting and anti-ulcerogenic activities, are disclosed.

---

This invention relates to 9,10-dihydro-4H-pyrazolo [1′,5′:1,6]pyrido[3,4-b]indole-2,3-dicarboxylic acids and esters, and processes for the preparation thereof. More particularly, this invention provides new, useful, and unobvious chemical compounds of the formula

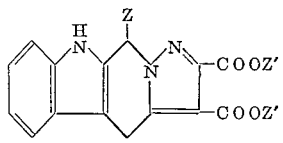

wherein Z represents an alkyl, cycloalkyl, cycloalkenyl, aralkyl, or optionally-substituted phenyl radical and Z′ represents hydrogen or, optimally, an alkyl radical.

Among the alkyl radicals represented by Z and Z′, lower alkyl radicals are preferred, i.e., methyl, ethyl, propyl, isopropyl, butyl, isobutyl, sec-butyl, tert-butyl, pentyl, neopentyl, hexyl, isohexyl, heptyl, or like monovalent, saturated, acyclic, straight- or branched-chain, hydrocarbon grouping of empirical formula

$-C_nH_{2n+1}$ wherein $n$ repreesnts a positive integer less than 8.

The cycloalkyl radicals represented by Z are typified by cyclopropyl, cyclobutyl, cyclopentyl, and cyclohexyl; and the cycloalkenyl radicals represented thereby are, specifically, those derived from the aforesaid cycloalkyl radicals by elimination of 2 hydrogens to give rise to an endocyclic double bond. Among the cycloalkyl and cycloalkenyl radicals represented by Z, the cyclohexyl and $\Delta^1$, $\Delta^2$, or $\Delta^3$ cyclohexyl—i.e., cyclohexenyl—groupings are preferred.

The aralkyl radicals represented by Z are preferably those comprising a methyl grouping substituted by phenyl wherein a second phenyl or a lower alkyl grouping can also be substituted. Illustrative of such radicals are benzyl, α - methylbenzyl, α - ethylbenzyl, α - isopropylbenzyl, diphenylmethyl, etc.

The optionally-substituted phenyl radicals represented by Z are preferably phenyl and phenyl substituted by a lower alkoxy grouping or halogen. Those skilled in the art will recognize that lower alkoxy groupings have the formula —O—lower alkyl wherein lower alkyl is defined as before. The halogens embraced by Z are most desirably those of atomic number greater than 9 and less than 53—i.e., chlorine and bromine. Positioning of the lower alkoxy or halo substituent about the benzene ring is not critical, o-, m-, and p-substituted phenyl groupings alike being contemplated.

Inasmuch as there is at least 1 asymmetric carbon atom present in each of the compounds of this invention, the compounds exist both as racemates and the stereochemically homogeneous isomers which compose them.

Compounds in which 2 asymmetric carbon atoms are present, such as the products of Example 7 hereinafter, commonly occur as mixtures of racemates separable, as illustrated, by fractional crystallization.

The compounds to which this invention relates are useful by reason of their valuable pharmacological properties. Thus, for example, they are pepsin-inhibiting and anti-ulcerogenic. The instant compounds are further useful in that they inhibit dicotyledenous seed germination.

The pepsin-inhibiting utility of the compounds of this invention is evident from the results of a standardized test for their effect on the proteolysis of hemoglobin by pepsin. The technique employed is a modification of that described by M. L. Anson in J. Gen. Physiol., 22, 79 (1938), and depends upon the fact that the aforesaid proteolysis results in liberation of peptides containing tyrosine and tryptophan units characterized by an absorption band in the ultraviolet spectrum at 275 mμ. Absorption at this wavelength serves therefore as an index of the extent to which the proteolysis has occurred. Each test is carried out in 4 test tubes to which are added solutions, measured in ml., of hemoglobin, pepsin, compound, hydrochloric acid, and perchloric acid. The additions are made immediately before and immediately after simultaneous incubation at 37° in accordance with the schedule shown in Table I.

TABLE I

| Test tube No. | Addns. at 0 time | | | | Addns. after 2 hr. at 37° | | |
|---|---|---|---|---|---|---|---|
| | HGB | PEP | CPD | HCl | CPD | HCl | HClO₄ |
| 1 | 5 | 1 | | 1 | 1 | | 1 |
| 2 | 5 | 1 | | 1 | 1 | | 1 |
| 3 | 5 | 1 | 1 | | | 1 | 1 |
| 4 | 5 | 1 | 1 | | | 1 | 1 |

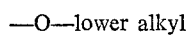

The hemoglobin solution (HGB) is prepared by mixing 60 gm. of Hemoglobin Substrate Powder (bovine) [Worthington Biochemical Corporation, Freehold, N.J.] with 2000 ml. of double distilled water, successively filtering and centrifuging the resultant slurry, adjusting the pH of the saturated solution thus separated to 2.0 with 6 N hydrochloric acid, and finally diluting with an equal volume of pH 2.0 hydrochloric acid, prepared as described below. The pepsin solution (PEP) is prepared by dissolving 4.0 mg. of 3X Crystallized Pepsin (hog) [Pentex, Incorporated, Kankakee, Ill.] in 200 ml. of pH 2.0 hydrochloric acid and diluting 6.25 ml. of the resultant solution with a further quantity of pH 2.0 hydrochloric acid q.s. 25 ml. The compound solution (CPD) is prepared by mixing 5 mg. of compound with 5.0 ml. of pH 2.0 hydrochloric acid and filtering out any material which remains insoluble. The hydrochloric acid solution (HCl) is prepared by diluting concentrated hydrochloric acid to pH 2.0 with double distilled water. The perchloric acid is prepared by diluting concentrated perchloric acid with double distilled water q.s. 20% by volume.

When the additions after incubation have been completed, the contents of each tube is filtered to remove undigested protein precipitated by the perchloric acid (which also serves to inactivate the enzyme), 1 ml. of each filtrate is diluted with 10 ml. of pH 5 sodium acetate buffer, and the resultant solutions are subjected to UV spectrophotometric analyses whereby the absorptions at 275 mμ are determined. Among the 4 values thus obtained for each compound tested, those deriving from tube Nos. 1 and 2 serve as controls, being representative of absorption due to peptides produced by incubation of uninhibited enzyme and substrate superimposed upon absorption due to compound itself, whereas those deriving from tube Nos. 3 and 4—so-called "treats"—represent absorption due to peptides produced by incubation of enzyme and substrate in the presence of compound, superimposed upon absorption due to compound itself. A compound is considered pepsin-inhibiting if the mean treat value (treat) is significantly ($P \leq 0.05$, student's t-test) less than the mean control value (control) therefor.

Results of the testing of the products of Examples 1C, 3C, and 8C hereinafter by this procedure are shown in Table II.

TABLE II

| Product | Control | Treat | Conclusion |
|---|---|---|---|
| 1C | .390 | .371 | Pepsin-inhibiting. |
| 3C | .406 | .378 | Do. |
| 8C | .388 | .372 | Do. |

Pepsin is known to play a causal role in the production of peptic ulcer.

The anti-ulcerogenic utility of the instant compounds hereinbefore specified is evident from the results of a standardized test for their capacity to inhibit the ulceration reported by Shay et al., Gastroenterology, 5, 43 (1945), to occur in rats subjected to fasting and pyloric ligation. In this test, male Charles River rats weighing 200–250 gm. and fasted 72 hr. prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hr. later, the stomachs of surviving animals are excised and examined under 5× magnification. The number of ulcers occurring in the non-secretory portion of each stomach is counted in 4 groups according to size (<2 mm., 2–4 mm., 4–8 mm., and >8 mm.); and each rat receives a score, $z$, which is a weighted average of the logarithms of the ulcer counts in the several size groups determined by a formula found approximately optimal by discriminant function analysis to be $$z = 20.00 \log (N_1+1) + 0.22 \log (N_2+1) + 46.76 \log (N_3+1) + 6.11 \log (N_4+1)$$

where $N_1 \ldots N_4$ are the observed ulcer counts of the increasing size groups. Since long-term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered anti-ulcerogenic.

Preparation of the instant compounds proceeds by contacting an acetic acid suspension of an appropriate 1,2,3,4-tetrahydro-9H-pyrido[3,4-b]indole-3-carboxylic acid

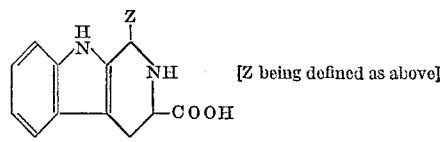

[Z being defined as above]

with cool aqueous sodium nitrite to give the corresponding 2-nitroso compound, which, upon heating with acetic anhydride, affords the corresponding meso-ionic didehydro 3a,4,9,10 - tetrahydro - 1H,3H - [1,2,3]oxadiazolo [3′,4′:1,6]pyrido[3,4-b]indole

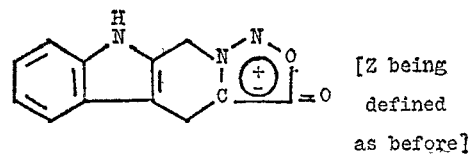

[Z being defined as before]

The latter compound is heated with an appropriate dialkyl acetylenedicarboxylate in ethylene glycol diethyl ether [diethyl Cellosolve] to give the 9,10-dihydro-4H-pyrazolo[1′,5′:1,6]pyrido[3,4-b]indole - 2,3-dicarboxylic acid ester hereof, from which the free acid is obtained by saponification with hot aqueous methanolic potassium carbonate.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 1,2,3,4-tetrahydro-2-nitroso-9H - pyrido[3,4 - b] indole-3-carboxylic acid.—To a suspension of 650 parts of 1,2,3,4-tetrahydro-9H - pyrido[3,4-b]indole - 3-carboxylic acid in 4000 parts of acetic acid at 15° is added, during 30 minutes with stirring, a solution of 235 parts of sodium nitrite in 400 parts of water. Stirring is continued 15 minutes longer, whereupon the resultant solution is mixed with decolorizing charcoal and filtered through diatomaceous earth. The filtrate is poured into 25,000 parts of ice-cold water, precipitating a yellowish solid which is filtered off, washed with water, and dried in air. The product thus isolated is 1,2,3,4-tetrahydro-2-nitroso - 9H - pyrido[3,4-b]indole-3-carboxylic acid melting at 176–178° with decomposition.

(B) Meso-ionic didehydro 3a,4,9,10-tetrahydro-1H, 3H-[1,2,3]oxadiazolo[3′,4′:1,6]pyrido[3,4 - b]indol - 3-one.—A suspension of 50 parts of 1,2,3,4-tetrahydro-2-nitroso-9H-pyrido[3,4-b]indole-3-carboxylic acid in 210 parts of acetic anhydride is stirred at 60–65° for 1½ hours, during which time solution occurs. The solution is allowed to cool to room temperature during 2 hours, resulting in the formation of a crystalline precipitate. The mixture is poured into 2500 parts of water, and stirring is thereupon resumed for 3 hours. Insoluble solids are filtered off, washed on the filter with water, dried in air, slurried in hot methanol, re-isolated by filtration, and washed on the filter with a mixture of cold methanol and ether to give meso-ionic didehydro 3a,4,9,10-tetrahydro-1H,3H - [1,2,3]oxadiazolo[3′,4′:1,6]pyrido[3,4 - b] indol-ol-3-one melting at 247–250° with decomposition.

(C) Dimethyl 9,10-dihydro-4H-pyrazolo[1′,5′:1,6]pyrido[3,4-b]indole-2,3-dicarboxylate.—A suspension of 227 parts of meso-ionic didehydro 3a,4,9,10-tetrahydro-1H, 3H[1,2,3]oxadiazolo[3′,4′:1,6]pyrido[3,4 - b]indol - 3-one in a mixture of 155 parts of dimethyl acetylenedicarboxylate with 1500 parts of ethylene glycol diethyl ether is heated at the boiling point under reflux for 2½ hours. Carbon dioxide is liberated and solution occurs in process. The solution is allowed to stand at room temperatures overnight, whereupon precipitation occurs. The precipitate, filtered off and recrystallized from acetone, affords dimethyl 9,10-dihydro-4H-pyrazolo[1′,5′:1,6]pyrido[3,4-b]indole-2,3-dicarboxylate melting at 253–255°. The product has the formula

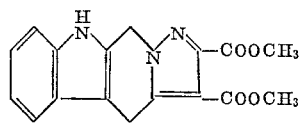

EXAMPLE 2

9,10-dihydro - 4H - pyrazolo[1′,5′:1,6]pyrido[3,4-b]indole-2,3-dicarboxylic acid.—To a suspension of 65 parts of dimethyl 9,10-dihydro-4H-pyrazolo[1′,5′:1,6]pyrido [3,4-b]indole-2,3-dicarboxylate in 1000 parts of methanol is added a solution of 60 parts of potassium carbonate in 250 parts of water. The resultant mixture is heated at the boiling point under reflux for 4 hours, then poured into 5000 parts of cold water. The solution which eventuates is stirred with decolorizing charcoal and filtered. The pH of the filtrate is adjusted to 4 with dilute hydrochloric acid, inducing precipitation of a crystalline solid which is isolated by filtration, washed with water, dried in air, washed by trituration with hot methanol, and again dried in air to give 9,10-dihydro-4H-pyrazolo[1',5':1,6]pyrido[3,4-b]indole-2,3-dicarboxylic acid melting at 250–253° with decomposition. The product has the formula

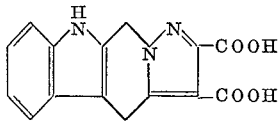

EXAMPLE 3

(A) 1,2,3,4-tetrahydro - 1 - methyl-2 - nitroso-9H-pyrido[3,4-b]indole-3-carboxylic acid.—Substitution of 690 parts of 1,2,3,4-tetrahydro-1-methyl-9H-pyrido[3,4-b]indole-3-carboxylic acid for the 1,2,3,4-tetrahydro-9H-pyrido[3,4-b]indole-3-carboxylic acid called for in Example 1A affords, by the procedure there detailed, 1,2,3,4-tetrahydro-1-methyl-2-nitroso-9H - pyrido[3,4-b]indole-3-carboxylic acid melting at approximately 183–184° with decomposition.

(B) Meso-ionic didehydro 3a,4,9,10-tetrahydro-10-methyl - 1H,3H - [1,2,3]oxadiazolo[3',4':1,6]pyrido[3,4-b]indol-3-one.—Substitution of 53 parts of 1,2,3,4-tetrahydro-1-methyl-2-nitroso-9H - pyrido[3,4-b]indole-3-carboxylic acid for the 1,2,3,4-tetrahydro-2-nitroso-9H-pyrido-[3,4-b]indole-3-carboxylic acid called for in Example 1B affords, by the procedure there detailed, meso-ionic didehydro 3a,4,9,10-tetrahydro-10-methyl-1H,3H-[1,2,3]oxadiazolo[3',4':1,6]pyrido[3,4 - b]indol - 3-one. The product decomposes at approximately 250° without melting.

(C) Dimethyl 9,10-dihydro-10-methyl-4H-pyrazolo[1',5':1,6]pyrido[3,4-b]indole-2,3 - dicarboxylate.—Substitution of 180 parts of meso-ionic didehydro 3a,4,9,10-tetrahydro-10 - methyl - 1H,3H - [1,2,3]oxadiazolo[3',4':1,6]pyrido[3,4-b]indol-3-one and 110 parts of dimethyl acetylenedicarboxylate for the 227 parts of meso-ionic didehydro 3a,4,9,10-tetrahydro - 1H,3H[1,2,3]oxadiazolo[3',4':1,6]pyrido[3,4-b]indol-3-one and 155 parts of dimethyl acetylenedicarboxylate, respectively, called for in Example 1C affords, by the procedure there detailed, dimethyl 9,10-dihydro-10 - methyl-4H - pyrazolo[1',5':1,6]pyrido[3,4-b]indole-2,3-dicarboxylate melting at approximately 230–231°. The product has the formula

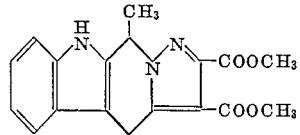

EXAMPLE 4

9,10 - dihydro-10-methyl-4H-pyrazolo[1',5':1,6]pyrido[3,4-b]indole-2,3-dicarboxylic acid.—Substitution of 68 parts of dimethyl 9,10-dihydro-10-methyl-4H-pyrazolo[1',5':1,6]pyrido[3,4-b]indole - 2,3 - dicarboxylate for the dimethyl 9,10 - dihydro - 4H - pyrazolo[1',5':1,6]pyrido[3,4-b]indole - 2,3 - dicarboxylate called for in Example 2 affords, by the procedure there detailed, 9,10-dihydro - 10 - methyl - 4H - pyrazolo[1',5':1,6]pyrido-[3,4-b]indole-2,3-dicarboxylic acid melting at approximately 275–276°. The product has the formula

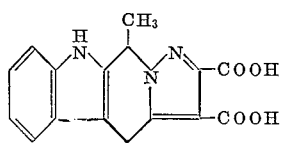

EXAMPLE 5

(A) 1 - cyclohexyl - 1,2,3,4 - tetrahydro - 9H - pyrido-[3,4 - b]indole - 3 - carboxylic acid.—To a solution of 817 parts of L-tryptophan in a mixture of 120 parts of 96% sulfuric acid and 5000 parts of water is added a solution of 493 parts of cyclohexanecarboxaldehyde in 5000 parts of ethanol. The resultant solution is heated at the boiling point under reflux in a nitrogen atmosphere for 17 hours, whereupon 4000 parts of concentrated ammonium hydroxide followed by 20 parts of decolorizing charcoal is slowly introduced. Heating at the boiling point under reflux is resumed for 10 minutes, at which point the mixture is filtered hot. The filtrate is diluted with 2000 parts of concentrated ammonium hydroxide and allowed to cool. The crystalline precipitate thrown down is 1-cyclohexyl - 1,2,3,4 - tetrahydro - 9H - pyrido[3,4 - b]indole-3-carboxylic acid which, filtered off, washed well with water, and dried in air, melts at 202–204°.

(B) 1 cyclohexyl - 1,2,3,4 - tetrahydro - 2 - nitroso-9H - pyrido[3,4 - b]indole - 3 - carboxylic acid.—To a suspension of 463 parts of 1-cyclohexyl-1,2,3,4-tetrahydro-9H-pyrido[3,4-b]indole-3-carboxylic acid in 3000 parts of acetic acid at 15° is added, during 30 minutes with stirring, a solution of 117 parts of sodium nitrite in 300 parts of water. Stirring is continued 15 minutes longer, whereupon the resultant solution is treated with decolorizing charcoal and filtered. The filtrate is poured into 20,000 parts of ice-cold water, precipitating a yellowish solid which is filtered off, washed with water, and dried in air. The product thus isolated is 1-cyclohexyl-1,2,3,4-tetrahydro - 2 - nitroso-9H-pyrido[3,4-b]indole-3-carboxylic acid.

(C) Meso - ionic didehydro 10 - cyclohexyl - 3a,4,-9,10 - tetrahydro - 1H,3H - [1,2,3]oxadiazolo[3',4':1,6]-pyrido[3,4-b]indol-3-one.—A solution of 43 parts of 1-cyclohexyl-1,2,3,4-tetrahydro - 2 - nitroso - 9H - pyrido[3,4-b]indole-3-carboxylic acid in 270 parts of acetic anhydride is heated to 50° with stirring, whereupon heating is discontinued while stirring is maintained for 2 hours longer. The resultant mixture is poured into 2000 parts of water. The mixture thus obtained is stirred for 3 hours, whereupon insoluble solids are filtered off, washed with water, dried in air, and further washed by slurrying in hot methanol. The resultant product is meso-ionic didehydro 10-cyclohexyl - 3a,4,9,10 - tetrahydro - 1H,3H - [1,2,3]oxadiazolo[3',4':1,6]pyrido[3,4 - b]indol - 3 - one melting at 214–216°.

(D) Dimethyl 10 - cyclohexyl - 9,10 - dihydro - 4H-pyrazolo[1',5':1,6]pyrido[3,4 - b]indole - 2,3 - dicarxoylate.—A suspension of 232 parts of meso-ionic didehydro 10 - cyclohexyl - 3a,4,9,10 - tetrahydro - 1H,3H - [1,2,3]-oxadiazolo[3',4':1,6]pyrido[3,4 - b]indol - 3 - one in a mixture of 116 parts of dimethyl acetylenedicarboxylate with 2000 parts of ethylene glycol diethyl ether is heated at the boiling point under reflux for 5 hours. Solvent is removed from the resultant solution by vacuum distillation. The residue is chromatographed on silica gel, using benzene and ethyl acetate as developing solvents. From an eluate comprising 20% ethyl acetate in benzene, on evaporation of solvent, dimethyl 10-cyclohexyl-9,10-dihydro-4H-pyrazolo[1',5':1,6]pyrido[3,4 - b]indole - 2,3 - dicarboxylate is obtained as the residue. The product has the formula

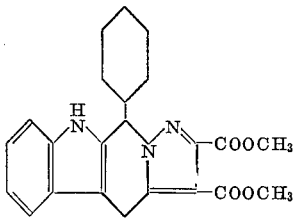

EXAMPLE 6

(A) 1 - (3 - cyclohexenyl) - 1,2,3,4 - tetrahydro - 9H-pyrido[3,4 - b]indole - 3 - carboxylic acid.—Substitution of 484 parts of 3-cyclohexene-1-carboxaldehyde for the cyclohexanecarboxaldehyde called for in Example 5A affords, by the procedure there detailed, 1-(3-cyclohexenyl)-1,2,3,4-tetrahydro-9H-pyrido[3,4 - b]indole - 3 - carboxylic acid melting at 193–195° with decomposition.

(B) 1 - (3 - cyclohexenyl) - 1,2,3,4 - tetrahydro - 2 - nitroso-9H-pyrido[3,4 - b]indole - 3 - carboxylic acid.— Substitution of 460 parts of 1-(3-cyclohexenyl)-1,2,3,4-tetrahydro - 9H - pyrido[3,4 - b]indole - 3 - carboxylic acid for the 1 - cyclohexyl - 1,2,3,4 - tetrahydro - 9H-pyrido[3,4-b]indole-3-carboxylic acid called for in Example 5B affords, by the procedure there detailed, 1-(3-cyclohexenyl) - 1,2,3,4 - tetrahydro - 2 - nitroso - 9H-pyrido[3,4-b]indole-3-carboxylic acid.

(C) Meso - ionic didehydro 10 - (3 - cyclohexenyl)-3a,4,9,10 - tetrahydro - 1H,3H - [1,2,3]oxadiazolo[3',4': 1,6]pyrido[3,4-b]indol-3-one.—Substitution of 43 parts of 1 - (3 - cyclohexenyl) - 1,2,3,4 - tetrahydro - 2 - nitroso-9H - pyrido[3,4 - b]indole - 3 - carboxylic acid for the 1 - cyclohexyl - 1,2,3,4 - tetrahydro - 2 - nitroso - 9H-pyrido[3,4 - b]indole - 3 - carboxylic acid called for in Example 5C affords, by the procedure there detailed, meso - ionic didehydro 10-(3-cyclohexenyl) - 3a,4,9,10-tetrahydro - 1H,3H - [1,2,3]oxadiazolo[3',4':1,6]pyrido-[3,4-b]indol-3-one melting at 216–218° with decomposition.

(D) Dimethyl 10 - (3-cyclohexenyl) - 9,10 - dihydro-4H - pyrazolo[1',5':1,6]pyrido[3,4-b]indole - 2,3 - dicarboxylate.—Substitution of 230 parts of meso-ionic didehydro 10 - (3-cyclohexenyl) - 3a,4,9,10 - tetrahydro-1H,3H - [1,2,3]oxadiazolo[3',4':1,6]pyrido[3,4-b]indol-3-one for the meso-ionic didehydro 10-cyclohexyl-3a,4,9,10 - tetrahydro - 1H,3H - [1,2,3]oxadiazolo[3',4':1,6]pyrido[3,4-b]indol-3-one called for in Example 5D affords, by the procedure there detailed, dimethyl 10-(3-cyclohexenyl) - 9,10 - dihydro - 4H - pyrazolo[1',5':1,6] pyrido[3,4-b]indole - 2,3 - dicarboxylate which, recrystallized from a mixture of acetone and n-pentane, melts at 186–188°. The product has the formula

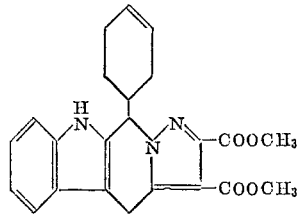

EXAMPLE 7

10 - (3-cyclohexenyl) - 9,10 - dihydro - 4H - pyrazolo[1',5':1,6]pyrido[3,4-b]indole - 2,3 - dicarboxylic acid.— A mixture of 81 parts of dimethyl 10-(3-cyclohexenyl)-9,10 - dihydro - 4H - pyrazolo[1',5':1,6]pyrido[3,4-b]indole-2,3-dicarboxylate and 60 parts of potassium carbonate with 900 parts of methanol and 300 parts of water is heated at the boiling point under reflux for 2 hours and then stirred into 7500 parts of water. The resultant mixture is let stand at around 5° overnight, at which point insoluble solids are filtered off, washed with ice-cold water, dried in air, and extracted with 20 volumes of boiling methanol. The material which remains insoluble is filtered out, consecutively washed with methanol and ether, and dried in air. The product thus isolated is 10-(3-cyclohexenyl) - 9,10 - dihydro - 4H - pyrazolo[1'5':1,6]pyrido[3,4-b]indole-2,3 - dicarboxylic acid melting at 282–284°, and having the formula

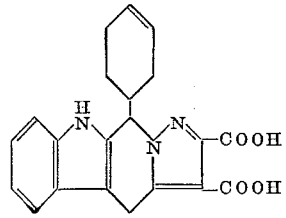

The boiling extract is mixed with decolorizing charcoal, and the mixture is filtered. The filtrate is concentrated by distillation to the point of incipient precipitation, then allowed to cool to room temperature. The precipitate is thereupon filtered off and dried in air. The product thus isolated is 10-(3-cyclohexenyl)-9,10-dihydro-4H-pyrazolo [1',5':1,6]pyrido[3,4-b]indole-2,3-dicarboxylic acid melting at approximately 265–266°.

EXAMPLE 8

(A) 1,2,3,4 - tetrahydro - 2 - nitroso - 1 - phenyl - 9H-pyrido[3,4-b]indole-3-carboxylic acid.—To a suspension of 450 parts of 1,2,3,4-tetrahydro - 1 - phenyl-9H-pyrido [3,4-b]indole-3-carboxylic acid in 2000 parts of acetic acid at 15° is added, during 30 minutes with stirring, a solution of 127 parts of sodium nitrite in 200 parts of water. The resultant solution is mixed with decolorizing charcoal, the mixture is filtered, and the filtrate is poured into 20,000 parts of ice-cold water. The yellow solid which precipitates is filtered off, washed with cold water, and dried in air. The resultant product is 1,2,3,4-tetrahydro - 2 - nitroso - 1 - phenyl - 9H - pyrido[3,4-b]indole-3-carboxylic acid.

(B) Meso-ionic didehydro 3a,4,9,10 - tetrahydro - 10-phenyl - 1H,3H - [1,2,3]oxadiazolo[3',4':1,6]pyrido [3,4-b]indol-3-one.—A solution of 35 parts of 1,2,3,4-tetrahydro - 2 - nitroso - 1 - phenyl - 9H - pyrido[3,4-b] indole-3-carboxylic acid in 150 parts of acetic anhydride is heated to 50°, whereupon heating is discontinued and the solution stirred for 2 hours and then poured into 1700 parts of water. The resultant mixture is stirred for 3 hours, at which point insoluble solids are filtered out, washed with water, dried in air, and washed by trituration in hot methanol to give meso-ionic didehydro 3a,4,9,10-tetrahydro - 10 - phenyl - 1H,3H - [1,2,3]oxadiazolo [3',4':1,6]pyrido[3,4-b]indol-3-one melting at 228–230° with decomposition.

(C) Dimethyl 9,10 - dihydro - 10 - phenyl - 4H - pyrazolo[1',5':1,6]pyrido[3,4-b]indole-2,3-dicarboxylate. — A suspension of 12 parts of meso-ionic didehydro 3a,4,9,10-tetrahydro - 10 - phenyl - 1H,3H - [1,2,3]oxadiazolo [3',4':1,6]pyrido[3,4-b]indol-3-one in a mixture of 10 parts of dimethyl acetylenedicarboxylate with 100 parts of ethylene glycol diethyl ether is heated at the boiling point under reflux for 3 hours, whereupon solvent is removed by vacuum distillation and the residue chromatographed on silica gel. From an eluate comprising 10% ethyl acetate in benzene, on evaporation of solvent and recrystallization of the residue from a mixture of acetone and n-pentane, dimethyl 9,10-dihydro-10-phenyl-4H-pyrazolo[1',5':1,6]pyrido[3,4-b]indole - 2,3 - dicarboxylate melting at approximately 225–226° is obtained. The product has the formula

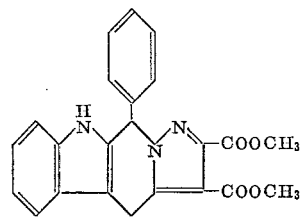

EXAMPLE 9

(A) 1 - (p-chlorophenyl) - 1,2,3,4 - tetrahydro - 2-nitroso - 9H - pyrido[3,4-b]indole - 3 - carboxylic acid.— Substitution of 490 parts of 1-(p-chlorophenyl)-1,2,3,4-tetrahydro-9H-pyrido[3,4-b]indole-3-carboxylic acid for the 1,2,3,4-tetrahydro-1-phenyl-9H-pyrido[3,4-b]indole-3-carboxylic acid called for in Example 8A affords, by the procedure there detailed, 1 - (p-chlorophenyl) - 1,2,3,4-tetrahydro - 2 - nitroso - 9H - pyrido[3,4-b]indole-3-carboxylic acid.

(B) Meso-ionic didehydro 10 - (p - chlorophenyl)-3a,4,9,10 - tetrahydro - 1H,3H - [1,2,3]oxadiazolo [3',4':1,6]pyrido[3,4-b]indol-3-one. — Substitution of 39 parts of 1-(p-chlorophenyl)-1,2,3,4-tetrahydro-2-nitroso-9H-pyrido[3,4-b]indole-3-carboxylic acid for the 1,2,3,4-tetrahydro - 2 - nitroso - 1 - phenyl - 9H - pyrido[3,4-b]indole-3-carboxylic acid called for in Example 8B affords, by the procedure there detailed, meso-ionic didehydro-10 - (p-chlorophenyl) - 3a,4,9,10 - tetrahydro - 1H,3H-[1,2,3]oxadiazolo[3',4':1,6]pyrido[3,4-b]indol - 3 - one melting at 224–226° with decomposition.

(C) Dimethyl 10(p - chlorophenyl)-9,10-dihydro-4H-pyrazolo[1',5':1,6]pyrido[3,4-b]indole - 2,3 - dicarboxylate.—A suspension of 135 parts of meso-ionic didehydro 10 - (p - chlorophenyl) - 3a,4,9,10 - tetrahydro - 1H,3H-[1,2,3]oxadiazolo[3',4':1,6]pyrido[3,4-b]indol-3-one in a mixture of 70 parts of dimethyl acetylenedicarboxylate with 1000 parts of ethylene glycol diethyl ether is heated at the boiling point under reflux for 3 hours, whereupon it is mixed with decolorizing charcoal and filtered. The filtrate is freed of solvent by vacuum distillation; and the residue is chromatographed on silica gel, using benzene and ethyl acetate as developing solvents. From an eluate comprising 10% ethyl acetate in benzene, on evaporation of solvent and recrystallization of the residue from a mixture of acetone and n-hexane, dimethyl 10-(p-chlorophenyl) - 9,10 - dihydro - 4H - pyrazolo[1',5':1,6]pyrido[3,4-b]indole-2,3-dicarboxylate melting at approximately 233–234° is obtained. The product has the formula

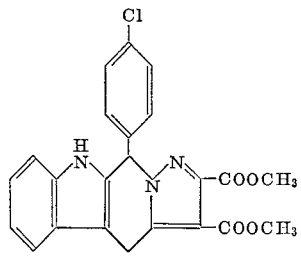

EXAMPLE 10

(A) 1-(m - bromophenyl) - 1,2,3,4 - tetrahydro-9H-pyrido[3,4-b]indole-3-carboxylic acid.—Substitution of 814 parts of m-bromobenzaldehyde for the cyclohexanecarboxaldehyde called for in Example 5A affords, by the procedure there detailed, 1-(m-bromophenyl)-1,2,3,4-tetrahydro-9H-pyrido[3,4-b]indole-3-carboxylic acid.

(B) 1-(m - bromophenyl)-1,2,3,4-tetrahydro-2-nitroso-9H-pyrido[3,4-b]indole-3-carboxylic acid.—Substitution of 572 parts of 1-(m-bromophenyl)-1,2,3,4-tetrahydro-9H-pyrido[3,4-b]indole-3-carboxylic acid for the 1,2,3,4-tetrahydro - 1 - phenyl - 9H - pyrido[3,4-b]indole-3-carboxylic acid called for in Example 8A affords, by the procedure there detailed, 1-(m-bromophenyl)-1,2,3,4-tetrahydro - 2 - nitroso - 9H - pyrido[3,4-b]indole-3-carboxylic acid.

(C) Meso-ionic didehydro 10 - (m - bromophenyl)-3a,4,9,10 - tetrahydro-1H,3H,[1,2,3]oxadiazolo[3',4':1,6]pyrido[3,4-b]indol-3-one.—Substitution of 44 parts of 1-(m-bromophenyl)-1,2,3,4-tetrahydro - 2 - nitroso-9H-pyrido[3,4-b]indole-3-carboxylic acid for the 1,2,3,4-tetrahydro-2-nitroso-1-phenyl - 9H - pyrido[3,4-b]indole-3-carboxylic acid called for in Example 8B affords, by the procedure there detailed, meso-ionic didehydro 10-(m-bromophenyl) - 3a,4,9,10 - tetrahydro - 1H,3H-[1,2,3]oxadiazolo[3',4':1,6]pyrido[3,4-b]indol-3-one.

(D) Dimethyl 10-(m-bromophenyl)-9,10-dihydro-4H-pyrazolo[1',5':1,6]pyrido[3,4-b]indole - 2,3 - dicarboxylate.—Substitution of 15 parts of meso-ionic didehydro 10-(m-bromophenyl) - 3a,4,9,10 - tetrahydro - 1H,3H-[1,2,3]oxadiazolo[3',4':1,6]pyrido[3,4-b]indol-3-one for the meso-ionic didehydro 3a,4,9,10-tetrahydro-10-phenyl-1H,3H - [1,2,3]oxadiazolo[3',4':1,6]pyrido[3,4-b]indol-3-one called for in Example 8C affords, by the procedure there detailed, dimethyl 10-(m-bromophenyl)-9,10-dihydro - 4H - pyrazolo[1',5':1,6]pyrido[3,4-b]indole-2,3-dicarboxylate, having the formula

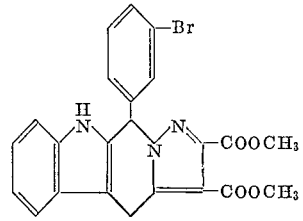

EXAMPLE 11

(A) 1,2,3,4 - tetrahydro - 1 - (p-methoxyphenyl)-2-nitroso-9H-pyrido[3,4-b]indole-3-carboxylic acid.—Substitution of 480 parts of 1,2,3,4-tetrahydro-1-(p-methoxyphenyl)-9H-pyrido[3,4-b]indole-3-carboxylic acid for the 1,2,3,4-tetrahydro - 1 - phenyl-9H-pyrido[3,4-b]indole-3-carboxylic acid called for in Example 8A affords, by the procedure there detailed, 1,2,3,4-tetrahydro-1-(p-methoxyphenyl) - 2 - nitroso - 9H - pyrido[3,4-b]indole-3-carboxylic acid.

(B) Meso-ionic didehydro 3a,4,9,10-tetrahydro-10-(p-methoxyphenyl) - 1H,3H - [1,2,3]oxadiazolo[3',4':1,6]pyrido[3,4-b]indol-3-one.—Substitution of 38 parts of 1,2,3,4-tetrahydro - 1 - (p-methoxyphenyl)-2-nitroso-9H-pyrido[3,4-b]indole-3-carboxylic acid for the 1,2,3,4-tetrahydro-2-nitroso - 1 - phenyl-9H-pyrido[3,4-b]indole-3-carboxylic acid called for in Example 8B affords, by the procedure there detailed, meso-ionic didehydro 3a,4,9,10 - tetrahydro - 10 - (p-methoxyphenyl)-1H,3H-[1,2,3]oxadiazolo[3',4':1,6]pyrido[3,4-b]indole - 3 - one melting at 198–200° with decomposition.

(C) Dimethyl - 9,10 - dihydro-10-(p-methoxyphenyl)-4H-pyrazolo[1',5':1,6]pyrido[3,4-b]indole - 2,3 - dicarboxylate.—Substitution of 13 parts of meso-ionic didehydro 3a,4,9,10 - tetrahydro-10-(p-methoxyphenyl)-1H,3H-[1,2,3]oxadiazolo[3',4':1,6]pyrido[3,4-b]indol-3-one for the meso-ionic didehydro 3a,4,9,10-tetrahydro-10-phenyl-1H,3H - [1,2,3]oxadiazolo[3',4':1,6]pyrido[3,4-b]indol-3-one called for in Example 8C affords, by the procedure there detailed, dimethyl - 9,10 - dihydro-10-(p-methoxyphenyl) - 4H - pyrazolo[1',5':1,6]pyrido[3,4-b]indole-2,3-dicarboxylate. The product has the formula

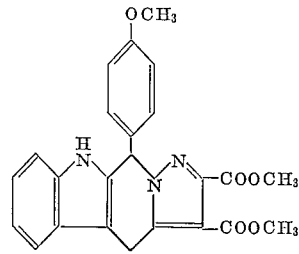

EXAMPLE 12

(A) 1 - (o - ethoxyphenyl) - 1,2,3,4 - tetrahydro-9H-pyrido[3,4-b]indole-3-carboxylic acid.—Substitution of 660 parts of o-ethoxybenzaldehyde for the cyclohexanecarboxaldehyde called for in Example 5A affords, by the procedure there detailed, 1-(o-ethoxyphenyl)-1,2,3,4-tetrahydro-9H-pyrido[3,4-b]indole-3-carboxylic acid.

(B) 1-(o-ethoxyphenyl) - 1,2,3,4-tetrahydro - 2-nitroso-9H-pyrido[3,4-b]indole - 3-carboxylic acid.—Substitution of 518 parts of 1-(o-ethoxyphenyl) - 1,2,3,4-tetrahydro-9H-pyrido[3,4-b]indole - 3 - carboxylic acid for the 1,2,3,4-tetrahydro-1-phenyl - 9H - pyrido[3,4-b]indole-3-carboxylic acid called for in Example 8A affords, by the procedure there detailed, 1-(o-ethoxyphenyl)-1,2,3,4-tetrahydro - 2 - nitroso - 9H-pyrido[3,4-b]indole - 3 - carboxylic acid.

(C) Meso - ionic didehydro 10 - (o-ethoxyphenyl)-3a,4,9,10 - tetrahydro - 1H,3H - [1,2,3]oxadiazolo

[3′,4′:1,6]pyrido[3,4 - b]indol - 3-one.—Substitution of 40 parts of 1 - (o-ethoxyphenyl) - 1,2,3,4-tetrahydro-2-nitroso-9H - pyrido[3,4-b]indole - 3-carboxylic acid for the 1,2,3,4-tetrahydro - 2-nitroso - 1-phenyl-9H-pyrido [3,4-b]indole-3-carboxylic acid called for in Example 8B affords, by the procedure there detailed, meso-ionic didehydro 10 - (o-ethoxyphenyl) - 3a,4,9,10 - tetrahydro-1H,3H - [1,2,3]oxadiazolo[3′,4′:1,6]pyriodo[3,4-b]indol-3-one.

(D) Dimethyl 10 - (o-ethoxyphenyl) - 9,10-dihydro-4H - pyrazolo[1′,5′:1,6]pyrido[3,4-b]indole-2,3 - dicarboxylate.—Substitution of 15 parts of meso-ionic didehydro 10-(o-ethoxyphenyl) - 3a,4,9,10-tetrahydro-1H,3H-[1,2,3]oxadiazolo[3′,4′:1,6]pyrido[3,4-b]indol - 3 - one for the meso-ionic didehydro 3a,4,9,10 - tetrahydro-10-phenyl - 1H,3H - [1,2,3]oxadiazolo[3′,4′:1,6]pyrido [3,4-b]indol-3-one called for in Example 8C affords, by the procedure there detailed, dimethyl 10-(o-ethoxyphenyl)-9,10 - dihydro - 4H-pyrazolo[1′,5′:1,6]pyrido[3,4-b] indole-2,3-dicarboxylate. The product has the formula

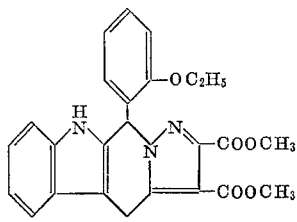

EXAMPLE 13

(A) 1-benzyl - 1,2,3,4 - tetrahydro - 2-nitroso - 9H-pyrido[3,4-b]indole-3-carboxylic acid.—To a suspension of 67 parts of 1-benzyl - 1,2,3,4 - tetrahydro-9H-pyrido [3,4-b]indole-3-carboxylic acid in 400 parts of acetic acid at 15° is added, during 30 minutes with stirring, a solution of 17 parts of sodium nitrite in 35 parts of water. The resultant solution is mixed with decolorizing charcoal, the mixture is filtered through diatomaceous earth, and the filtrate is stirred into 300 parts of water. The yellow solid which precipitates is filtered off, washed with water, and dried in air. The product thus isolated is 1 - benzyl-1,2,3,4 - tetrahydro - 2-nitroso - 9H-pyrido [3,4-b]indole-3-carboxylic acid.

(B) Meso-ionic didehydro 10-benzyl - 3a,4,9,10-tetrahydro - 1H,3H-[1,2,3]oxadiazolo[3′,4′:1,6]pyrido[3,4-b] indole-3-one.—A solution of 65 parts of 1-benzyl-1,2,3,4-tetrahydro - 2 - nitroso - 9H-pyrido[3,4,b]indole-3-carboxylic acid in 300 parts of acetic anhydride is heated to 50°, whereupon heating is discontinued and the solution is stirred for 2 hours and then poured into 2500 parts of water. The resultant mixture is stirred for 4 hours, at which point insoluble solids are filtered out, washed with water, dried in air, and recrystallized from methanol to give meso-ionic didehydro 10-benzyl - 3a,4,9,10-tetrahydro - 1H,3H - [1,2,3]oxadiazolo[3′,4′:1,6]pyrido[3,4-b] indol-3-one melting at 215–217°.

(C) Dimethyl 10-benzyl-9,10 - dihydro - 4H-pyrazolo [1′,5′:1,6]pyrido[3,4-b]indole - 2,3 - dicarboxylate.—A suspension of 22 parts of meso-ionic didehydro 10-benzyl-3a,4,9,10 - tetrahydro - 1H,3H - [1,2,3]oxadiazolo [3′,4′:1,6]pyrido[3,4-b]indol-3-one in a mixture of 11 parts of dimethyl acetylenedicarboxylate with 200 parts of ethylene glycol diethyl ether is heated at the boiling point under reflux for 8 hours, whereupon solvent is removed by vacuum distillation and the residue recrystallized from a mixture of acetone and n-pentane to give dimethyl 10 - benzyl - 9,10 - dihydro - 4H - pyrazolo [1′,5′:1,6]pyrido[3,4-b]indole - 2,3 - dicarboxylate melting at approximately 206–207°. The product has the formula

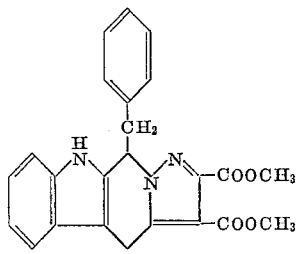

EXAMPLE 14

10-benzyl - 9,10 - dihydro - 4H - pyrazolo[1′,5′:1,6] pyrido[3,4-b]indole - 2,3-dicarboxylic acid.—A mixture of 80 parts of dimethyl 10-benzyl-9,10 - dihydro-4H-pyrazolo[1′,5′:1,6]pyrido[3,4 - b]indole - 2,3 - dicarboxylate with 1000 parts of methanol and a solution of 60 parts of potassium carbonate in 250 parts of water is heated at the boiling point under reflux for 4 hours and then poured into 5000 parts of cold water. The resultant solution is stirred with decolorizing charcoal and then filtered. The pH of the filtrate is adjusted to 4 with dilute hydrochloric acid, precipitating a crystalline solid which, filtered off, washed with water, dried in air, and recrystallized from methanol, affords 10-benzyl-9,10-dihydro-4H-pyrazolo[1′,5′:1,6]pyrido[3,4-b]indole - 2,3 - dicarboxylic acid melting at 226–228°. The product has the formula

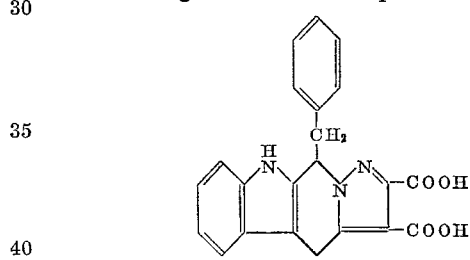

EXAMPLE 15

(A) 1,2,3,4-tetrahydro - 1 - (α-methylbenzyl)-2-nitroso-9H-pyrido[3,4-b]indole - 3 - carboxylic acid.—To a suspension of 490 parts of 1,2,3,4-tetrahydro-1-(α-methylbenzyl)-9H-pyrido[3,4-b]indole - 3 - carboxylic acid in 3000 parts of acetic acid at 15° is added, during 30 minutes with stirring, a solution of 115 parts of sodium nitrite in 250 parts of water. The resultant solution is mixed with decolorizing charcoal, the mixture is filtered through diatomaceous earth, and the filtrate is stirred into 3000 parts of water The yellow solid which precipitates is filtered off, washed with water, and dried in air. The product thus isolated is 1,2,3,4-tetrahydro-1-(α-methylbenzyl)-2-nitroso-9H-pyrido[3,4-b]indole - 3 - carboxylic acid.

(B) Meso-ionic didehydro 3a,4,9,10-tetrahydro-10-(α-methylbenzyl) - 1H,3H - [1,2,3]oxadiazolo[3′,4′:1,6] pyrido[3,4-b]indol-3-one.—A solution of 65 parts of 1,2, 3,4-tetrahydro - 1 - (α-methylbenzy - 2 - nitroso-9H-pyrido[3,4-b]indole-3-carboxylic acid in 3000 parts of acetic anhydride is heated to 50°, whereupon heating is discontinued and the solution is stirred for 2 hours and then poured into 2500 parts of water. The resultant mixture is stirred for 4 hours, at which point insoluble solids are filtered out, washed on the filter with water, dried in air, washed by slurrying in hot methanol, and again dried in air to give meso-ionic didehydro 3a,4,9,10-tetrahydro - 10 - (α-methylbenzyl)-1H,3H-[1,2,3]oxadiazolo [3′,4′:1,6]pyrido[3,4-b]indol-3-one melting at approximately 237–238°.

(C) Dimethyl 9,10-dihydro - 10 - (α-methylbenzyl)-4H - pyrazolo[1′,5′:1,6]pyrido[3,4-b]indole - 2,3 - dicarboxylate.—A suspension of 100 parts of meso-ionic didehydro 3a,4,9,10-tetrahydro - 10 - (α-methylbenzyl)-1H, 3H-[1,2,3]oxadiazolo[3′,4′:1,6]pyrido[3,4-b]indol - 3 - one in a mixture of 57 parts of dimethyl acetylenedicarboxylate with 1000 parts of ethylene glycol diethyl ether is heated at the boiling point under reflux for 5 hours, whereupon solvent is removed by vacuum distillation and the residue chromatographed on silica gel. From an eluate comprising 10% ethyl acetate in benzene, on evaporation of solvent and recrystallization of the residue from a mixture of acetone and n-pentane, dimethyl 9,10-dihydro-10-(α-methylbenzyl) - 4H-pyrazolo[1',5':1,6]pyrido[3,4-b]indole-2,3-dicarboxylate melting at approximately 155–156° is obtained. The product has the formula

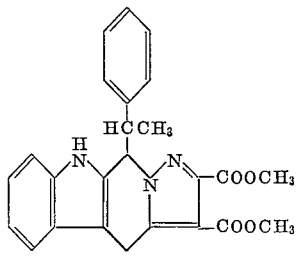

EXAMPLE 16

9,10-dihydro - 10 - (α-methylbenzyl)-4H-pyrazolo[1',5':1,6]pyrido[3,4-b]indole - 2,3 - dicarboxylic acid.—Substitution of 85 parts of dimethyl 9,10-dihydro-10-(α-methylbenzyl) - 4H - pyrazolo[1',5':1,6-]pyrido[3,4-b]indole-2,3-dicarboxylate for the dimethyl 10-benzyl-9,10-dihydro-4H-pyrazolo[1',5':1,6]pyrido[3,4-b]indole - 2,3-dicarboxylate called for in Example 14 affords, by the procedure there detailed, 9,10-dihydro-10-(α-methylbenzyl) - 4H - pyrazolo[1',5':1,6]pyrido[3,4-b]indole-2,3-dicarboxylic acid melting at approximately 263–264°. The product has the formula

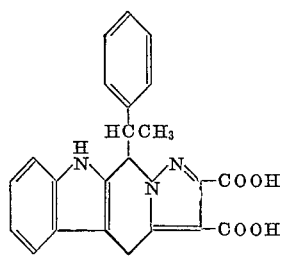

EXAMPLE 17

(A) 1,2,3,4-tetrahydro - 1 - diphenylmethyl-9H-pyrido[3,4-b]indole-3-carboxylic acid.—Substitution of 860 parts of diphenyl acetaldehyde for the cyclohexanecarboxaldehyde called for in Example 5A affords, by the procedure there detailed, 1,2,3,4-tetrahydro-1-diphenylmethyl-9H-pyrido[3,4-b]indole - 3 - carboxylic acid melting at approximately 197–198°.

(B) 1,2,3,4-tetrahydro - 2 - nitroso-1-diphenylmethyl-9H-pyrido[3,4-b]indole - 3 - carboxylic acid.—To a suspension of 50 parts of 1,2,3,4-tetrahydro-1-diphenylmethyl-9H-pyrido[3,4-b]indole - 3 - carboxylic acid in 350 parts of acetic acid at 15° is added, during 30 minutes with stirring, a solution of 10 parts of sodium nitrite in 25 parts of water. Stirring is continued 30 minutes longer, whereupon the resultant solution is treated with decolorizing charcoal and filtered. The filtrate is poured into 2000 parts of ice-cold water, precipitating a yellowish solid which is filtered off, washed with cold water, and dried in air to give 1,2,3,4-tetrahydro-2-nitroso-1-diphenylmethyl-9H-pyrido[3,4-b]indole-3-carboxylic acid melting at 189–191°.

(C) Meso-ionic didehydro 3a,4,9,10-tetrahydro-10-diphenylmethyl - 1H,3H - [1,2,3]oxadiazolo[3',4':1,6]pyrido[3,4-b]indol-3-one.—A solution of 50 parts of 1,2,3,4-tetrahydro-2-nitroso - 1 - diphenylmethyl-9H-pyrido[3,4-b]indole-3-carboxylic acid in 250 parts of acetic anhydride is heated to 55°, whereupon precipitation occurs and heating is discontinued. The resultant solution is stirred for 2 hours, then poured into 2000 parts of water. Stirring is resumed for 3 hours, at which point insoluble solids are filtered out, washed with water, dried in air, and recrystallized from methanol to give meso-ionic didehydro 3a,4,9,10-tetrahydro - 10 - diphenylmethyl-1H,3H-[1,2,3]oxadiazolo[3',4':1,6]pyrido[3,4-b]indol - 3 - one melting at 243–245° with decomposition.

(D) Dimethyl 9,10-dihydro - 10 - diphenylmethyl-4H-pyrazolo[1',5':1,6]pyrido[3,4-b]indole - 2,3 - dicarboxylate.—A suspension of 157 parts of meso-ionic didehydro 3a,4,9,10-tetrahydro - 10 - diphenylmethyl-1H,3H-[1,2,3]oxadiazolo[3',4':1,6]pyrido[3,4-b]indol-3-one in a mixture of 67 parts of dimethyl acetylenedicarboxylate with 2000 parts of ethylene glycol diethyl ether is heated at the boiling point under reflux for 5 hours, whereupon solvent is removed by vacuum distillation and the residue recrystallized from a mixture of acetone and n-pentane to give dimethyl 9,10-dihydro-10-diphenylmethyl-4H-pyrazolo[1',5':1,6]pyrido[3,4-b]indole - 2,3 - dicarboxylate melting at approximately 194–194.5°. The product has the formula

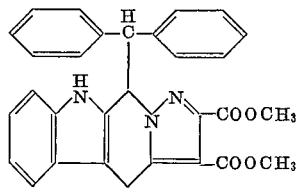

EXAMPLE 18

9,10 - dihydro - 10 - diphenylmethyl - 4H - pyrazolo-[1',5':1,6]pyrido[3,4-b]indole-2,3 - dicarboxylic acid.—To a suspension of 97 parts of dimethyl 9,10-dihydro-10-diphenylmethyl - 4H - pyrazolo[1',5':1,6]pyrido[3,4-b]indole-2,3-dicarboxylate in 1000 parts of methanol is added a solution of 60 parts of potassium carbonate in 250 parts of water. The resultant mixture is heated at the boiling point under reflux for 4 hours, then poured into 5000 parts of cold water. The solution which eventuates is stirred with decolorizing charcoal and filtered. The pH of the filtrate is adjusted to 4 with dilute hydrochloric acid, inducing precipitation of a crystalline solid which is isolated by filtration, washed with water, dried in air, and recrystallized from methanol to give 9,10-dihydro-10 - diphenylmethyl - 4H - pyrazolo[1',5':1,6]pyrido[3,4-b]indole-2,3-dicarboxylic acid melting at approximately 235–236°. The product has the formula

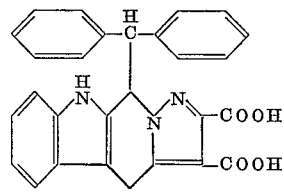

What is claimed is:
1. A compound of the formula

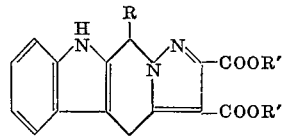

wherein R represents hydrogen, lower alkyl, cyclohexyl, cyclohexenyl, phenyl, halophenyl in which the halo constituent has an atomic number greater than 9 and less than 53, (lower alkoxy)phenyl, benzyl, α-methylbenzyl, or diphenylmethyl and R' represents hydrogen or lower alkyl.

2. A compound according to claim 1 wherein R' represents lower alkyl.

3. A compound according to claim 1 wherein R represents hydrogen.

4. A compound according to claim 1 which is dimethyl 9,10 - dihydro - 4H - pyrazolo[1',5':1,6]pyrido[3,4 - b]indole-2,3-dicarboxylate.

5. A compound according to claim 1 wherein R represents methyl.

6. A compound according to claim 1 which is dimethyl 9,10 - dihydro - 10 - methyl - 4H - pyrazolo[1',5':1,6]pyrido[3,4-b]indole-2,3-dicarboxylate.

7. A compound according to claim 1 wherein R represents cyclohexenyl.

8. A compound according to claim 1 which is dimethyl 10 - (3 - cyclohexenyl) - 9,10 - dihydro - 4H - pyrazolo[1',5':1,6]pyrido[3,4-b]indole-2,3-dicarboxylate.

9. A compound according to claim 1 which is dimethyl 9,10 - dihydro - 10 - phenyl - 4H - pyrazolo[1',5':1,6]pyrido[3,4-b]indole-2,3-dicarboxylate.

10. A compound according to claim 1 wherein R represents halophenyl in which the halo constituent is chlorine or bromine.

11. A compound according to claim 1 which is dimethyl 10 - (p - chlorophenyl) - 9,10 - dihydro - 4H - pyrazolo[1',5':1,6]pyrido[3,4-b]indole-2,3-dicarboxylate.

12. A compound according to claim 1 wherein R represents benzyl.

13. A compound according to claim 1 which is dimethyl 10 - benzyl - 9,10 - dihydro - 4H - pyrazolo[1',5':1,6]pyrido[3,4-b]indole-2,3-dicarboxylate.

14. A compound according to claim 1 wherein R represents α-methylbenzyl.

15. A compound according to claim 1 which is 9,10-dihydro - 10 - (α - methylbenzyl) - 4H - pyrazolo[1',5':1,6]pyrido[3,4-b]indole-2,3-dicarboxylic acid.

References Cited

UNITED STATES PATENTS 3,299,078   1/1967   Pachter _____ 260—296

HENRY R. JILES, Primary Examiner

ALAN L. ROTMAN, Assistant Examiner

U.S. Cl. X.R.

260—295; 424—266, 269